Sept. 23, 1958 A. NUUT 2,853,680

PHASE MODULATOR

Filed May 6, 1955

AUGUST NUUT
INVENTOR.

BY
Seymour M. Rosenberg
ATTORNEY 2,853,680

PHASE MODULATOR

August Nuut, Glendale, Calif., assignor, by mesne assignments, to the United States of America as represented by the United States Atomic Energy Commission Application May 6, 1955, Serial No. 506,406

4 Claims. (Cl. 332—16)

This invention relates to a phase modulator and more particularly to a phase modulator which utilizes a variable resistance switch operable at the frequency of an applied carrier signal and under the control of a modulating signal for modulating the phase of the carrier signal.

In general, phase modulation has heretofore been produced by varying the value of a circuit element in a phase shifting network in accordance with variations in the modulating signal. According to one prior art technique, a reactance tube circuit is employed to vary the capacitance of the modulation circuit. The most serious disadvantage of this type of circuit is that its stability depends upon the stability of the electrical characteristics of the reactance tube. In addition the circuit is relatively expensive in that several vacuum tubes are often required to achieve satisfactory performance.

In still other forms of prior art phase modulators the carrier frequency is modulated by utilizing one or more non-linear resistance elements in the modulator network to provide the desired phase shift. For example, it is common practice to employ a crystal rectifier or vacuum tube diode as a low level variable impedance by operating the device over a portion of its forward characteristic, as disclosed in U. S. Patent No. 2,316,155 entitled "Phase Modulation," issued April 13, 1943, to M. G. Crosby. The principal disadvantage of this form of phase modulator is that the stability of the circuit is directly affected by changes in the characteristics of the diode through aging, ambient temperature variations and other environmental changes.

In still another form of prior art phase modulator circuit the impedance of the phase shifting network is varied by utilizing one or more vacuum tube diodes or crystal rectifiers in series with a capacitor, the combination being coupled in parallel to a tuned circuit. In operation the diode or rectifier is employed to switch the series capacitor into and out of the tuned circuit, thereby varying the capacitive reactance of the tuned circuit for modulating the phase of the applied carrier signal. Several examples of this form of prior art phase modulator are disclosed in U. S. Patent Nos. 2,559,023 and 2,588,511, issued July 3, 1951, and March 11, 1952, respectively, to M. A. McCoy. One of the principal disadvantages of this form of phase modulator circuit is that the phase modulated carrier signal is also amplitude modulated to a significant extent, thereby requiring the use of a limiter stage following the modulator for limiting the amplitude of the modulated output signal. In addition, the operating point of the unidirectional current device is not stabilized, thereby making the modulator sensitive to even minor changes in the operating characteristics of its circuit elements.

The present invention, on the other hand, provides a phase modulator which obviates the above and other disadvantages of the phase modulators of the prior art while retaining substantially all of their advantages. According to the basic concept of the present invention there is provided a phase modulator which includes as frequency determining elements an inductor, capacitor and a unidirectional current device, the unidirectional current device being utilized as a switch, operable at the carrier frequency and under the control of the modulating signal, to provide a variable resistance.

More particularly, according to the preferred embodiment of the invention, the phase modulator herein disclosed includes a rectifier or diode in series with a capacitor, the combination being connected in parallel with an inductor to form a tuned circuit across which the carrier signal is applied. In addition, the phase modulator includes an associated circuit for normally biasing the rectifier in its forward direction with a current whose magnitude varies in accordance with the amplitude of the modulating signal. In operation, the biasing current is operative in conjunction with the current component produced by the carrier signal through the capacitor to switch the rectifier, or in other words back bias the rectifier, once during each cycle of the carrier signal, the period through which the rectifier is back biased being determined by the amplitude of the biasing current. The effective series resistance presented by the rectifier to the capacitor in the tuned circuit is thus a function of the ratio of the periods through which the rectifier is back biased and forward biased; consequently the impedance presented to the applied carrier signal is variable in accordance with the magnitude of the modulating signal.

In operation the phase modulator of the invention not only eliminates the customary problem of simultaneous amplitude modulation but also provides a stabilized circuit by virtue of the fact that current feedback from the biasing source makes the circuit substantially independent of variations in the electrical characteristics of the rectifier. In addition the utilization of a rectifier as a variable resistance switch provides phase modulation over a range which is much larger, for a given limit of distortion, than the modulation range of the modulators of the prior art.

It is therefore an object of the invention to provide a phase modulator wherein a unidirectional current element is utilized as a variable resistance switch for modulating the phase of an applied carrier signal in accordance with variations in the amplitude of an applied modulating signal.

Another object of the invention is to provide a phase modulator wherein a crystal rectifier or diode is employed as a variable resistor in a phase shift network for varying the phase of an applied carrier signal, the rectifier being switched between its forward and reverse directions at the frequency of the carrier signal and under the control of the modulating signal.

Still another object of the invention is to provide a phase modulator which utilizes a phase shift network including a unidirectional current device for modulating an applied carrier signal, the rectifier being normally forward biased and being back biased for a portion of each cycle of the carrier signal to provide a variable resistance.

A further object of the invention is to provide a phase modulator which utilizes a phase shift network including a unidirectional current device for modulating an applied carrier signal, the rectifier being operable under the control of the modulating signal to provide a variable resistance, the rectifier being forward biased during a portion of each cycle of the carrier signal and back biased during the remainder of each cycle, the effective resistance presented by the rectifier being a function of the intervals through which it is back biased and forward biased.

The novel features which are believed to be characteristic of the invention, both as to its oragnization and method of operation, together with further objects and advantages thereof, will be better understood from the following description considered in connection with the accompanying drawings in which a preferred embodiment of the invention is illustrated by way of example.

It is to be expressly understood, however, that the drawings are for the purpose of illustration and description only, and are not intended as a definition of the limits of the invention.

Figures 1, 2:
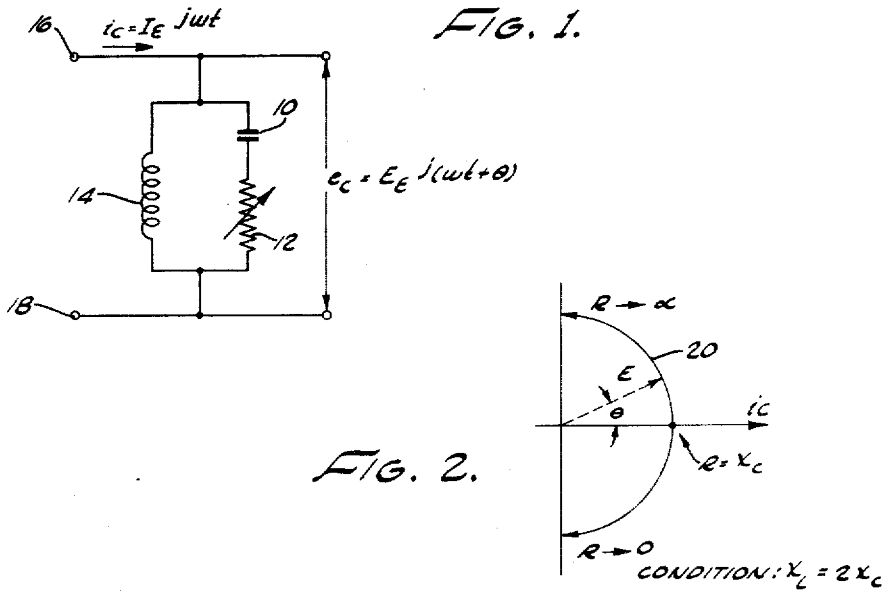
Fig. 1 is a schematic view of the generalized form of a phase shift network employed in the phase modulator of the invention.
Fig. 2 is a vector diagram illustrating the carrier voltage and current relationships in the phase shift network of Fig. 1.

With reference now to the drawings, wherein the same reference characters are utilized to designate like or corresponding parts throughout the several views, there is shown in Fig. 1 a schematic diagram of the phase shift network employed in the phase modulator of the invention. Basically the phase shift network includes a serially connected capacitor 10 and variable resistor 12, the combination being connected in parallel with an inductor 14 to form a tuned circuit the phase of whose impedance varies in accordance with the setting of variable resistor 12. As shown in Fig. 1, the carrier signal to be modulated is impressed across a pair of input terminals 16 and 18, the input carrier current being designated by the term $i_c=I\epsilon^{j\omega t}$. The output signal from the modulator is in turn expressed by the term $e_c=E\epsilon^{j(\omega t\pm\theta)}$, the carrier modulation provided by the phase shift network being designated by the phase angle $\theta$ which vectorially separates the carrier signal voltage from the carrier signal current.

It will be immediately recognized that the impedance presented to the carrier signal by the phase shift network of Fig. 1 is given by the equation $$Z=\frac{(R-jX_C)jX_L}{R-jX_C+jX_L} \qquad (1)$$

where $$X_C=\frac{1}{\omega C}$$

or the capacitive reactance of capacitor 10 at the carrier frequency; where $X_L=\omega L$ or the inductive reactance of inductor 14 at the carrier frequency; and $R$=the instantaneous resistance of variable resistor 12.

The absolute value of the impedance presented to the carrier signal may then be written as $$|Z|=\frac{\omega L[1+(\omega RC)^2]^{1/2}}{[(1-\omega^2LC)^2+(\omega RC)^2]^{1/2}} \qquad (2)$$

Differentiating Equation 2 with respect to R and letting $$\frac{d|Z|}{dR}\rightarrow 0$$

yields the equation $$\omega^2LC=2 \qquad (3)$$

which defines the relationship between L and C for the condition that the absolute impedance Z remain constant as R is varied. Equation 3 may then be rewritten as $$\omega L=X_L=\frac{2}{\omega C}=2X_C \qquad (4)$$

which signifies that the impedance is constant when the inductive reactance ($X_L$) of inductor 14 equals twice the capacitive reactance ($X_C$) of capacitor 10. It may also be shown by substitution of Equation 3 in Equation 2 that $$|Z|=\omega L \qquad (5)$$

Substituting now Equation 4 in Equation 1 above, the following expression for the impedance of the modulator may be derived:

$$Z=\frac{2X_C(X_C+jR)}{R-jX_C} \qquad (6)$$

From Equation 6 it will be recognized that the impedance presented to the carrier signal by the phase shift network of Fig. 1 has a constant absolute magnitude equal to $2X_C$, or in other words $X_L$, but varies in phase with changes in the value of variable resistance R in accordance with the equation $$\theta=\tan^{-1}\frac{R}{X_C}-\tan^{-1}\frac{X_C}{R} \qquad (7)$$

With reference now to Fig. 2, there is shown a vector diagram which correlates the phase of carrier voltage ($e_c$) relative to the carrier current ($i_c$) for the condition that the inductive reactance ($X_L$) of inductor 14 equals twice the capacitive reactance ($X_C$) of capacitor 10. Assuming the current vector to lie along the abscissa of the vector diagram, the locus of the voltage vector as R is varied from zero to infinity defines a semicircle, which is designated 20. It will be noted from both Fig. 2 and Equation 7 that when $R=X_C$ the impedance presented by the phase shift network is purely resistive.

It is clear that if the phase shift network of Fig. 1 is to be utilized in a phase modulator, then the resistance of variable resistor 12 must vary in accordance with variations in the amplitude and polarity of the modulating signal. In addition it is clear that if the degree of modulation is to be relatively large, or in other words, if the phase angle $\theta$ is to approach $+90°$ and $-90°$, then the resistance must be capable of varying from a relatively low value to a relatively high value with respect to the absolute magnitude of the capacitive reactance $X_C$.

Figure 3:
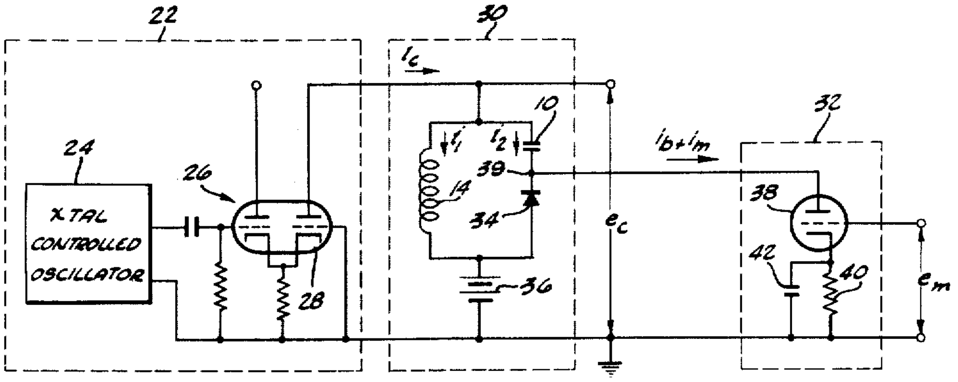
Fig. 3 is a schematic diagram of the phase modulator of the invention.

According to the present invention, a variable resistor whose resistance is variable over an exceptionally wide range is provided by utilizing a diode or crystal rectifier in the phase shift network. With reference now to Fig. 3, there is shown a schematic diagram of the phase modulator of the invention for modulating the phase of a carrier signal applied from a carrier signal source 22 in accordance with variations in the amplitude and polarity of an applied modulating signal. Basically the modulator includes two principal component circuits, namely, a phase shift network, generally designated 30, and a modulating signal and biasing source, generally designated 32, for varying the impedance presented by the phase shift network to the carrier signal.

Carrier signal source 22 may be any suitable source of constant frequency carrier signals, and as shown in Fig. 3 includes a crystal control oscillator 24 coupled to an isolation amplifier, generally designated 26. The particular isolation amplifier shown in the drawing includes a twin triode 28 connected as a cathode coupled amplifier, the advantage of this particular circuit being that it presents a relatively high impedance to oscillator 24. It will be recognized, of course, that the carrier signal source may take any of numerous other circuit configurations, and that the circuit of Fig. 3 is not intended to limit the invention.

Phase shift network 30 is similar to the network shown in Fig. 1 in that it also includes an interconnected capacitor 10 and an inductor 14. However, the variable resistor employed in the phase modulator of the invention constitutes a unidirectional current device 34, which may be either a crystal rectifier or vacuum tube diode, for example, whose cathode is connected to one terminal of capacitor 10 and whose anode is coupled to one end of inductor 14 and to the positive terminal of a B+ battery 36, the negative terminal of battery 36 being grounded. It will be recognized, of course, that insofar as the applied carrier signal is concerned, the inductor and unidirectional current device are connected directly to ground, or in other words, at signal frequency there is an ohmic connection between these two elements and ground. For purposes of clarity, the unidirectional current device will hereinafter be termed rectifier 34.

Modulating signal and biasing source 32 preferably comprises a constant current source and may include any conventional circuit which is capable of normally forward biasing rectifier 34 with a composite current which includes a constant D. C. bias current component and a modulating signal current component. As shown in Fig. 1, source 32 includes a triode 38, a cathode resistor 40 connected to the cathode of the triode, and a bypass capacitor 42 connected across resistor 40, capacitor 42 providing an effective short circuit across the cathode resistor at carrier signal frequency. The plate of triode 38 is connected to the common junction 39 of capacitor 10 and rectifier 34, while the grid of the triode is connected to a modulating signal generator, not shown, for receiving the modulating signal ($e_m$).

It will be recognized by those skilled in the art that source 32 is thus actually a constant current generator for a given steady-state signal applied to the grid of triode 38, cathode resistor 40 functioning as a negative feedback element for maintaining constant the D. C. current component through rectifier 34, in the absence of a carrier signal, and irrespective of variations in the electrical characteristics of the rectifier. Consequently, application of the modulating signal to the grid of triode 38 will produce a current through rectifier 34, in the absence of a carrier signal, which has a predetermined constant D. C. component, hereinafter designated ($i_b$), and a superimposed modulating component, hereinafter designated ($i_m$). It is clear, of course, that the modulating component of current will vary in amplitude in accordance with variations in the applied modulating signal ($e_m$).

Consider now the operation of the phase modulator of the invention when a carrier signal is applied in the absence of a modulating signal. With reference again to Fig. 3, the current which flows through rectifier 34 from source 32 will then be merely ($i_b$). In addition, the carrier current ($i_c$) will split into two components ($i_1$) and ($i_2$), as shown in the drawings, current ($i_2$) flowing through capacitor 10. It is clear, of course, that the carrier current ($i_c$) and its current component ($i_2$) are actually alternating signals, and consequently current ($i_2$) does not actually flow continuously in the direction of the associated arrow shown in the drawings.

It will be recognized by those skilled in the art that when rectifier 34 is forward biased, substantially all of the carrier current component ($i_2$) will flow to ground through the rectifier. More specifically, the resistance to ground through the rectifier when forward biased is substantially equal to its forward impedance which may be as low as 50 ohms; the resistance to ground through source 33, on the other hand, is relatively high and may be shown to be larger than the plate resistance of triode 38.

Consider now the behavior of rectifier 34 during a single cycle of the carrier signal. When the carrier current component ($i_2$) flows in the same direction as the biasing current, the rectifier remains continuously forward biased. As the carrier current component reverses and flows opposite to the biasing component ($i_b$), however, the rectifier remains forward biased only when the component ($i_2$) is smaller in magnitude than current component ($i_b$), or stated differently, only while the voltage of common junction 39 is lower than the positive potential of battery 36. When current component ($i_2$) tends to become larger than biasing component ($i_b$) rectifier 34 is back-biased and presents a relatively high resistance, of the order of a megohm to the carrier signal. Consequently the effective resistance from common junction 39 to ground is substantially equal to the output impedance of source 32.

As the carrier current component ($i_2$) continues through its cycle, rectifier 34 again becomes forward biased and remains forward biased until ($i_2$) again equals and flows opposite to biasing component ($i_b$) during the succeeding cycle of the carrier signal. Accordingly it is clear that for each cycle of the carrier signal rectifier 34 is back biased for a predetermined interval, hereinafter termed $T_1$, and forward biased for a predetermined interval hereinafter termed $T_2$. Consequently the resistance to ground from common junction 39 is a function of $T_1$ and $T_2$, and in addition, of the impedance of source 32 and the forward and back impedance of rectifier 34.

If it is assumed that $R_F << R << R_B$, where $R_F$ and $R_B$ are the forward and back impedances of a practical diode or rectifier, and R is the effective value of the variable resistance to be presented to the carrier signal, then the effective impedance to ground from common junction 39 as seen by the carrier signal is primarily a function of $T_1$, $T_2$ and $R_S$, where $R_S$ is the effective impedance of source 32. It will be recognized therefore, that if the resistance $R_S$ and the carrier signal current component ($i_2$) are assumed to be constant, the effective resistance from junction 39 to ground in the absence of a modulating signal may be controlled by selecting the proper value of biasing current ($i_b$), since this current component will then determine the relative magnitudes of the time intervals $T_1$ and $T_2$ during which rectifier 34 is back biased and forward biased, respectively.

It will be recalled from the description of Figs. 1 and 2 that the carrier current ($i_c$) and carrier voltage ($e_c$) are in phase when $R = X_C$. Consequently, the bias current component ($i_b$) should be selected to control the switching interval of rectifier 34 so as to provide, in the absence of a modulating signal, a resistance to ground which has the same absolute magnitude as the reactance of capacitor 10.

Consider now the operation of the phase modulator of the invention when a modulating signal ($e_m$) is applied to the grid of triode 38. It is obvious that the current flowing through both rectifier 34 and triode 38 will be equal to ($i_b$)+($i_m$), and will vary in amplitude with variations in the amplitude of the modulating signal. Since the carrier current ($i_c$) may be assumed to be relatively constant owing to the fact that the magnitude of the impedance of the phase shift circuit remains constant, it is clear that the intervals $T_1$ and $T_2$ will vary in duration in accordance with the variations in the modulating signal. More specifically, each time the polarity of the modulating signal current component ($i_m$) is such as to increase the current through rectifier 34, then the interval $T_1$ through which the rectifier is back biased is decreased while the interval $T_2$ through which the rectifier is forward biased is increased. Conversely, when the polarity of the modulating signal current component is such as to decrease the bias current through rectifier 34 then the interval $T_1$ is increased while the interval $T_2$ is decreased. Accordingly, the effective resistance from common junction 39 to ground will vary in accordance with variations in the amplitude of the modulating signal, and as a consequence thereof, the phase of the carrier signal ($e_c$) will also be varied in accordance with variations in the modulating signal.

In view of the foregoing description it will be recognized that the phase modulator of the invention is operative to vary the phase of an applied carrier signal in accordance with variations in the amplitude of an applied modulating signal by utilizing a rectifier of diode as a high level variable resistance switch which is switched through one cycle during each cycle of the carrier frequency, the effective resistance presented being a function of the time intervals throughout which the rectifier is forward and back biased. In practice it has been found that the phase modulated carrier signal produced by the phase modulator of the invention is substantially free from amplitude modulation. Consequently, the conventional limiter stage which is customarily utilized following a conventional phase modulator is not essential to the modulator of the invention. In addition, the modulated signal produced by the phase modulator of the invention is substantially free from distortion over a modulating range which is far larger than the range provided by phase modulators of the prior art for a corresponding amount of distortion. Still another significant advantage of the phase modulator of the invention is that the circuit is extremely stable and its modulation sensitivity is unaffected by variations in ambient conditions which tend to vary the electrical characteristics of rectifiers and vacuum tubes owing to the fact that current feedback is utilized to stabilize the effective *rf* resistance of the rectifier.

It will be recognized, of course, that the invention is not to be limited by the specific circuit shown in Fig. 3, and that numerous modulator innovations and alterations may be made in this circuit without departing from the basic concept of the invention. For example, source 32 may employ, in lieu of the specific circuit shown, circuits utilizing transistors, magnetic amplifiers, or other forms of multiple electrode vacuum tubes. In addition, the B+ voltage supply 36 shown in phase shift circuit 30 could be connected to rectifier 34 alone with inductor 14 connected directly to ground. Accordingly, it is to be expressly understood that the invention is to be limited only by the spirit and scope of the appended claims.

What is claimed as new is:

1. A phase modulator for modulating the phase of an applied carrier signal in accordance with variations in the magnitude and polarity of an applied modulating signal while presenting a substantially constant absolute value of impedance to the carrier signal, said modulator comprising: a phase shift network including an inductor and a series circuit of a capacitor and a crystal rectifier, said series circuit being connected in parallel with said inductor; first means for applying the carrier signal across said inductor and said series circuit to produce a first carrier signal current component in said inductor and a second carrier signal current component in said series circuit; and second means connected across said crystal rectifier for normally forward biasing said crystal rectifier, in the absence of a carrier signal, with a biasing current of predetermined magnitude, said second means being responsive to the modulating signal for varying the magnitude of said biasing current in accordance with the variations in the magnitude and polarity of the modulating signal, said crystal rectifier being responsive to the magnitudes and polarities of said biasing current and said second carrier signal current component for presenting a variable resistance in series with said capacitor to vary the phase of the impedance presented by said phase shift network to the carrier signal in accordance with variations in the modulating signal.

2. A phase modulator for modulating the phase of an applied carrier signal in accordance with variations in the magnitude and polarity of an applied modulating signal, said modulating circuit comprising: a phase shift network including an inductor and a series circuit including a capacitor and a variable resistor, said series circuit being connected in parallel with said inductor; means for applying the carrier signal across said inductor and said series circuit; said variable resistor including a rectifier coupled to said inductor and said capacitor, said rectifier being back biased during a portion of each cycle of the carrier signal and front biased during the remainder of each cycle, and biasing means connected in parallel with said rectifier for normally applying a forward bias of predetermined magnitude thereto, said biasing means being responsive to the applied modulating signal for varying the magnitude of said forward bias in accordance with variations in the amplitude of the modulating signal whereby the intervals through which said rectifier is forward biased and back biased are varied in accordance with the modulating signal.

3. The phase modulator defined in claim 2 wherein said rectifier includes an anode and a cathode and wherein said biasing means includes a vacuum tube having at least a control grid for receiving the modulating signal, an anode and a cathode, said anode of said vacuum tube being connected to said cathode of said rectifier, and a cathode resistor intercoupling said cathode of said vacuum tube with said anode of said unidirectional current device.

4. A phase modulator for modulating the phase of an applied carrier signal in accordance with variations in the magnitude and polarity of an applied modulating signal, said modulator comprising: an inductor having first and second terminals; a capacitor having first and second terminals, said first terminal of said capacitor being connected to said first terminal of said inductor; means for applying the carrier signal to said first and second terminals of said inductor; and a variable resistance circuit intercoupling said second terminals of said capacitor and said inductor, said variable resistance circuit including a diode rectifier, said diode rectifier being normally back biased and forward biased during each cycle of the carrier signal, variable biasing means connected across said diode rectifier for normally applying a forward bias of predetermined magnitude to said diode rectifier, said rectifier being forward biased for a first predetermined time interval and back biased for a second predetermined time interval during each cycle of the carrier signal in response to the carrier signal and said forward bias, whereby said diode rectifier and said biasing means normally present an effective resistance of predetermined magnitude to the carrier signal; and means for varying said variable biasing means to vary said forward bias in accordance with the magnitude and polarity of the modulating signal whereby the duration of said first and second time intervals are varied to vary the effective resistance presented to the carrier signal.

References Cited in the file of this patent

UNITED STATES PATENTS

| | | |
|---|---|---|
| 2,182,377 | Guanella | Dec. 5, 1939 |
| 2,523,222 | Marks | Sept. 19, 1950 |
| 2,583,138 | Carter et al. | Jan. 22, 1952 |
| 2,782,049 | Riddle | Dec. 20, 1955 |